United States Patent [19]

Sirrenberg et al.

[11] 3,878,269

[45] Apr. 15, 1975

[54] O-(1-HALOPHENYL-2-CHLORO)-VINYL-PHOSPHORIC ACID DIESTER-AMIDES

[75] Inventors: Wilhelm Sirrenberg, Sprockhovel; Bernhard Homeyer, Opladen; Ingeborg Hammann, Cologne; Hans Scheinpflug, Leverkusen, all of Germany

[73] Assignee: Bayer Aktiengesellschaft, Leverkusen, Germany

[22] Filed: Aug. 29, 1973

[21] Appl. No.: 392,723

[30] Foreign Application Priority Data

Sept. 19, 1972 Germany............................ 2245811

[52] U.S. Cl............. 260/957; 260/243 B; 260/247; 260/950; 260/293.72; 260/326.61; 424/200; 424/211
[51] Int. Cl............................ C07f 9/24; A01n 9/36
[58] Field of Search..................................... 260/957

[56] References Cited
UNITED STATES PATENTS
2,927,122    3/1960    Schrader............................ 260/957
FOREIGN PATENTS OR APPLICATIONS
744,360    2/1960    United Kingdom................. 260/957

Primary Examiner—Anton H. Sutto
Attorney, Agent, or Firm—Burgess, Dinklage & Sprung

[57] ABSTRACT

O-(1-halophenyl-2-chloro)-vinyl-phosphoric acid diester-amides of the formula

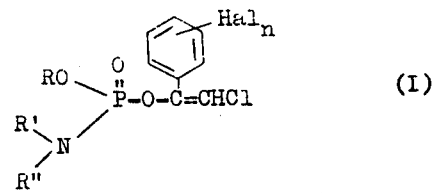

in which
R is alkyl of 1 to 12 carbon atoms, haloalkyl of 1 to 4 carbon atoms, alkoxyalkyl of 1 to 6 carbon atoms in each alkyl or alkoxy moiety, alkenyl of 2 to 6 carbon atoms, or phenyl, phenylalkyl, cycloalkyl, cycloalkenyl or cycloalkenalkyl optionally substituted by halogen or alkyl of 1 to 4 carbon atoms,
R' and R" each independently is hydrogen, lower alkyl, alkenyl or phenylalkyl, or
R' and R" together with the nitrogen atom form a heterocyclic ring,
Hal is chlorine or bromine, and
n is an integer from 1 to 5,
which possess insecticidal, acaricidal, fungicidal and bactericidal properties.

7 Claims, No Drawings

O-(1-HALOPHENYL-2-CHLORO)-VINYL-PHOSPHORIC ACID DIESTER-AMIDES

The present invention relates to and has for its objects the provisions of particular new O-(1-halophenyl-2-chloro)-vinyl-phosphoric acid diester-amides, e.g. O-alkyl-O-(1-mono- to -penta-halophenyl-2-chloro)-vinyl-phosphoric acid diester-amides wherein the nitrogen atom may be singly or doubly substituted, which possess insecticidal, acaricidal, fungicidal and bactericidal properties, active compositions in the form of mixtures of such compounds with solid and liquid dispersible carrier vehicles, and methods for producing such compounds and for using such compounds in a new way especially for combating pests, e.g. insects, acarids, fungi and bacteria, especially insects, acarids and fungi, with other and further objects becoming apparent from a study of the within specification and accompanying examples.

It is known from German Published Specification DAS Nos. 1,215,137 and 1,198,605, and U.S. Pat. No. 3,102,842 that vinylphosphoric acid triesters, such as O,O-dimethyl-(Compound A) or O,O-diethyl-O-[1-(2',4'-dichlorophenyl)-2-chlorovinyl]- (Compound B) or-[1-(2',4',5'-trichlorophenyl)-2-chlorovinyl]-phosphoric acid esters (Compounds C and D), possess insecticidal and acaricidal properties.

The present invention provides vinylphosphoric acid diester-amides of the general formula

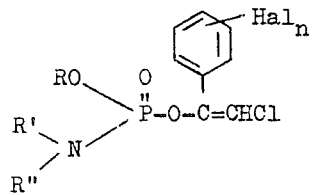

(I)

in which
R is alkyl of 1 to 12 carbon atoms, haloalkyl of 1 to 4 carbon atoms, alkoxyalkyl of 1 to 6 carbon atoms in each alkyl or alkoxy moiety, alkenyl of 2 to 6 carbon atoms, or phenyl, phenylalkyl, cycloalkyl, cycloalkenyl or cycloalkenalkyl optionally substituted by halogen or alkyl of 1 to 4 carbon atoms,
R' and R" each independently is hydrogen, lower alkyl, alkenyl or phenylalkyl, or
R' and R" together with the nitrogen atom form a heterocyclic ring,
Hal is chlorine or bromine, and
$n$ is an integer from 1 to 5.

Preferably, R is straight-chain or branched alkyl of 1 to 10 carbon atoms, chloroethyl, allyl, alkoxyalkyl of 1 to 4 carbon atoms per alkyl and alkoxy moiety, phenyl, chlorophenyl, phenylalkyl of 1 to 3 carbon atoms in the alkyl moiety, cyclohexyl, p-methylcyclohexyl, cyclohexylmethyl, cyclohexylethyl or cyclohex-(1)-en-4-yl-methyl; R' and R" are hydrogen, straight-chain or branched alkyl of 1 to 4 carbon atoms, allyl or benzyl or together with the nitrogen atoms, form a five-membered or six-membered heterocyclic ring optionally including an oxygen, sulfur or additional nitrogen atom; Hal is chlorine; and $n$ is 2 or 3.

Surprisingly, the vinylphosphoric acid diester-amides according to the invention display a better insecticidal, especially soil insecticidal, acaricidal and fungicidal action than previously known compounds of analogous structure and similar type of action. The compounds according to the present invention thus represent a genuine enrichment of the art. Furthermore, the new substances contribute to meeting the great demand for constantly new preparations in the field of combating of pests. This demand arises from the fact that the commercially available agents have to meet constantly higher standards especially with regard to the protection of the environment, such as low toxicity towards warm-blooded animals and low phytotoxicity, rapid degradation in and on the plant in short intervals between application and harvesting, and activity towards resistant pests.

The general formula (I) encompasses the corresponding cis- and trans-isomers of the structures (II) and (III) as well as mixtures of these isomers:

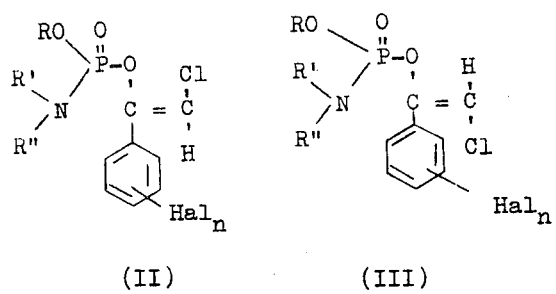

(II)                    (III)

The invention also provides a process for the production of a vinylphosphoric acid diester-amide of the structure (I) in which a vinylphosphoric acid ester dichloride of the general formula

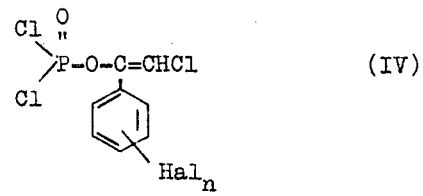

(IV)

is reacted with an alcohol of the formula

ROH            (V)

in the form of an alkali metal salt, alkaline earth metal salt or ammonium salt or in the presence of an acid-binding agent, and the resulting intermediate, generally without isolation, is reacted with ammonia or an amine of the general formula

(VI)

in the presence of an acid-binding agent. In the above-mentioned formulae

R, R', R'', Hal and $n$ have the meanings indicated earlier.

If 0-[1-(2',4'-dichlorophenyl)-2-chlorovinyl]-phosphoric acid ester dichloride, methanol and methylamine are used as starting materials, the course of the reaction can be represented by the following reaction scheme:

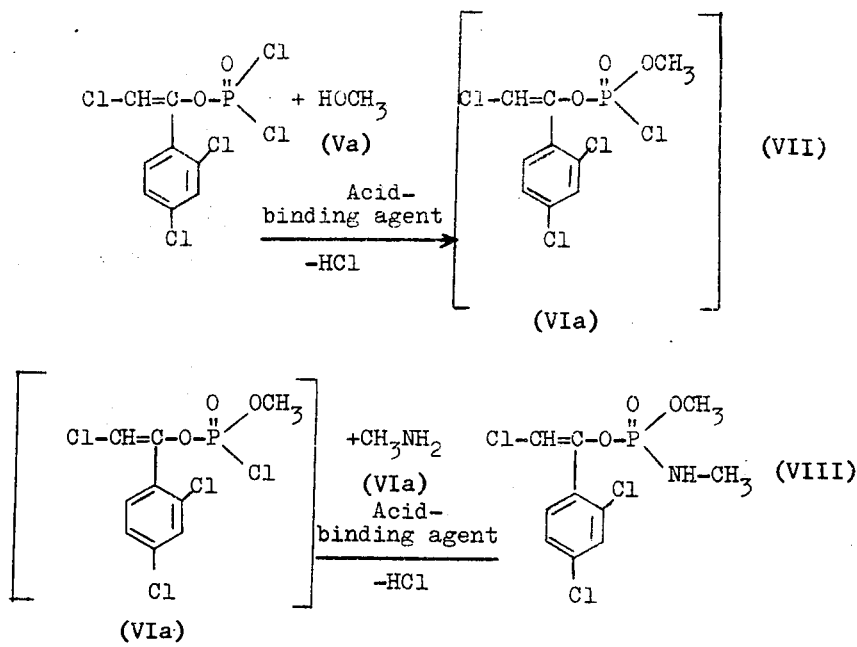

The alcohols (V) and amines (VI) required as starting substances are known from the literature and can also be prepared easily on an industrial scale.

The following are specific examples of alcohols and amines for use in the process: methanol, ethanol, n- and iso-propanol, n-, sec-, iso- and tert.-butanol, pentanol, 2-methylbutanol, hexanol, 2-ethyl-butanol, 2,2-dimethylbutanol octanol, 2-ethylhexanol, 2,2-dimethylhexanol, decanol and 2,2-dimethyloctanol; allyl, chloroethyl, methoxyethyl, ethoxyethyl, propoxyethyl and butoxyethyl alcohols; phenol, p-chlorophenol, phenethyl alcohol, methylphenylcarbinol, 1-phenyl-propanol-(3), cyclohexanol, p-methylcyclohexanol, cyclohexylmethanol, β-cyclohexylethanol and cyclohex-(1)-en-4-yl-methanol; as well as ammonia, methylamine, dimethylamine, ethylamine, diethylamine, n-propylamine, iso-propylamine, di-n-propylamine, di-iso-propylamine, n-butylamine, di-n-butylamine, iso-butylamine, di-iso-butylamine, sec-butylamine, di-sec-butylamine, tert-butylamine, di-tert-butylamine, allylamine, benzylamine, pyrrolidine, piperidine, morpholine and thiomorpholine.

The vinylphosphoric acid ester dichlorides (IV) also required as starting materials can be prepared according to processes known in principle, for example from the corresponding halophenacyl chlorides and phosphorus oxychloride or from 0,0-dialkyl-0-vinylphosphoric acid triester derivatives and phosphorus pentachloride (see German Published Specification DOS No. 2,137,383 and DAS No. 1,263,748). The following are specific examples of suitable starting substances: 0-[1-(2',4'-dichlorophenyl)-2-chlorovinyl]- or 0-[1-(2',4',5'-trichlorophenyl)-2-chlorovinyl]-phosphoric acid ester dichloride.

The process for the production of the new compounds (I) is preferably carried out in the presence of a solvent or diluent. As such, practically all inert organic solvents can be employed. Preferred examples include aliphatic and aromatic optionally chlorinated hydrocarbons, such as benzene, toluene, xylene, benzine, methylene chloride, chloroform, carbon tetrachloride, chlorobenzene; ethers, for example diethyl ether, dibutyl ether and dioxane; ketones, for example acetone, methyl ethyl ketone, methyl isopropyl ketone, methyl isobutyl ketone; and nitriles, such as acetonitrile, propionitrile.

All customary acid-binding agents can be used as acid acceptors. Alkali metal carbonates and alkali metal alcoholates, such as sodium carbonate and potassium carbonate, sodium methylate and potassium methylate, and sodium ethylate and potassium ethylate, have proved particularly suitable, as have aliphatic, aromatic or heterocyclic amines, for example triethylamine, dimethylamine, dimethylaniline, dimethylbenzylamine and pyridine. An excess of the particular amine (VI) used for the reaction can also serve as the acid-binding agent.

The reaction temperatue can be varied within a wide range. In general, the reaction is carried out at −10° to 100°, perferably at −5° to 40°C in both process stages. The reaction is generally allowed to take place at normal pressure.

In most cases, the reactants are used in equimolar ratio. An excess of one or other component does not seem to result in an significant advantages.

In general, a solution of the alcohol (V) is added dropwise to a solution of the vinylphosphoric acid ester dichloride (IV) at the indicated temperatures, in the presence of an acid-binding agent, the mixture is allowed to complete reacting for one to several hours and a solution of amine (VI) and fresh acid-binding agent is then added dropwise. After completion of the reaction, the salt-like precipitate which has separated out is either filtered off or washed out with water and the filtrate is worked up in the usual manner by washing, drying and concentration or distillation.

Some of the new compounds are obtained in the form of oils which cannot always be distilled without decomposition but can be freed of the last volatile constituents by so-called "slight distillation", that is prolonged heating under reduced pressure to moderately elevated temperature, and can be purified in this way. They are characterized by the refractive index. Others of the new compounds are obtained in a crystalline form having a sharp melting point.

As already mentioned, the new vinylphosphoric acid diester-amides are distinguished by an excellent insecticidal, especially soil-insecticidal and acaricidal, activity towards plant pests, hygiene pests and pests of stored products. They possess a good action both against sucking and against biting insects and mites (Acarina).

For this reason, the compounds according to the invention can be employed successfully as agents for combating pests, in plant protection and in the hygiene field and the field of protection of stored products.

To the sucking insects there belong, in the main aphids (Aphidae) such as the green peach aphid (*Myzus persicae*), the bean aphid (*Doralis fabae*), the bird cherry aphid (*Rhopalosiphum padi*), the pea aphid (*Macrosiphum pisi*) and the potatoe aphid (*Macrosiphum solanifolii*), the currant gall aphid (*Cryptomyzus korschelti*), the rosy apple aphid (*Sappaphis mali*), the mealy plum aphid (*Hyalopterus arundinis*) and the cherry black-fly (*Myzus cerasi*); in addition, scales and mealybugs (Coccina), for example the oleander scale (*Aspidiotus hederae*) and the soft scale (*Lecanium hesperidum*) as well as the grape mealybug (*Pseudococcus maritimus*); thrips (Thysanoptera), such as *Hercinothrips femoralis*, and bugs, for example the beet bug (*Piesma quadrata*), the red cotton bug (*Dysdercus intermedius*), the bed bug (*Cimex lectularius*), the assassin bug (*Rhodnius prolixus*) and Chagas' but (*Triatoma infestans*) and, further, cicadas, such as *Euscelis bilobatus* and *Neophotettix bipunctatus*.

In the case of the biting insects, above all there should be mentioned butterfly and moth caterpillars (Lepidoptera) such as the diamond-back moth (*Plutella maculipennis*), the gypsy moth (*Lymantria dispar*), the brown-tail moth (*Euproctis chrysorrhoea*) and tent caterpillar (*Malacosoma neustria*); further, the cabbage moth (*Mamestra brassicae*) and the cut-worm (*Agrotis segetum*), the large white butterfly (*Pieris brassicae*), the small winter moth (*Cheimatobia brumata*), the green oak tortrix moth (*Tortrix viridana*), the fall armyworm (*Laphygma frugiperda*) and cotton worm (*Prodenia litura*), the ermine moth (*Hyponomeuta padella*), the Mediterranean flour moth (*Ephestia kuhniella*) and greater wax moth (*Galleria mellonella*).

Also to be classed with the biting insects are beetles (Coleoptera), for example the granary weevil (*Sitophilus granarius* = *Calandra granaria*), the Colorado beetle (*Leptinotarsa decemlineata*), the dock beetle (*Gastrophysa viridula*), the mustard beetle (*Phaedon cochleariae*), the blossom beetle (*Meligethes aeneus*), the raspberry beetle (*Byturus tomentosus*), the bean weevil (*Bruchidius* = *Acanthoscelides obtectus*), the leather beetle (*Dermestes frischi*), the khapra beetle (*Trogoderma granarium*), the flour beetle (*Tribolium castaneum*), the northern corn billbug (*Calandra* or *Sitophilus zeamais*), the drugstore beetle (*Stegobium paniceum*), the yellow mealworm (*Tenebrio molitor*) and the saw-toothed grain beetle (*Oryzaephilus surinamensis*), and also species living in the soil, for example wireworms (Agriotes spec.) and larvae of the cockchafer (*Melolontha melolontha*); cockroaches, such as the German cockraoach (*Blattella germanica*), American cockroach (*Periplaneta americana*), Madeira cockroach (Leucophaea or (*Rhyparobia maderae*), oriental cockroach (*Blatta orientalis*), the giant cockroach (*Blaberus giganteus*) and the black giant cockroach (*Blaberus fuscus*) as well as *Henschoutedenia flexivitta*; further, Orthoptera, for example the house cricket (*Gryllus domesticus*); termites such as the eastern subterranean termite (*Reticulitermes flavipes*) and Hymenoptera such as ants, for example the garden ant (*Lasius niger*).

The Diptera comprise essentially the flies, such as the vinegar fly (*Drosophila melanogaster*), the Mediterranean fruit fly (*Ceratitis capitata*), the house fly (*Musca domestica*), the little house fly (*Fannia canicularis*), the black blow fly (*Phormia aegina*) and bluebottle fly (*Calliphora erythrocephala*) as well as the stable fly (*Stomoxys calcitrans*); further, gnats, for example mosquitoes such as the yellow fever mosquito (*Aedes aegypti*), the northern house mosquito (*Culex pipiens*) and the malaria mosquito (*Anopheles stephensi*).

With the mites (Acari) there are classed, in particular, the spider mites (Tetranychidae) such as the twospotted spider mite (*Tetranychus telarius* = *Tetranychus althaeae* or *Tetranychus urticae*) and the European red mite (*Paratetranychus pilosus* = *Panonychus ulmi*), gall mites, for example the blackcurrant gall mite (*Eriophyes ribis*) and tarsonemids, for example the broad mite (*Hemitarsonemus latus*) and the cyclamen mite (*Tarsonemus pallidus*); finally, ticks such as the relapsing fever tick (*Ornithodorus moubata*).

When applied against hygiene pests and pests of stored products, particularly flies and mosquitoes, the compounds are also distinguished by an outstanding residual activity on wood and clay, as well as a good stability to alkali on limed substrates.

The active compounds according to the invention furthermore display, as also already mentioned, a strong fungitoxic and a bacteriotoxic action. They do not harm crop plants in the concentrations required for combating fungi and bacteria and only have a low toxicity towards warm-blooded animals. For these reasons, they are also suitable for combating fungi and bacteria and are employed as fungitoxic agents in plant protection, against Archimycetes, Phycomycetes, Asomycetes, Basidiomycetes and Fungi Imperfecti.

The active compounds according to the invention show a very broad spectrum of action and can therefore be employed against parasitory fungi and bacteria which attack parts of plants which are above ground, or those which attack the plants through the soil, and also against seed-borne pathogens.

The active compounds according to the invention have proved of especial value in combating diseases of rice. Thus, they shown an excellent action against the fungi *Piricularia oryzae* and *Pellicularia sasakii*, for which reason they can be employed for the conjoint combating of these two diseases. This represents an important advance since hitherto agents of different chemical constitution were required against these two fungi. Surprisingly, the new products not only possess a protective action but also a curative and systemic effect.

The components according to the invention however are also active against other fungi which attack rice plants or other crop plants, for example *Cochliobolus myiabeanus, Mycosphaerella musicola, Cercospora personata, Botrytis cinerae,* Alternaira spec. *Verticillium alboatrum, Phialophora cinerescens* and Fusarium spec., as well as against the bacterium *Xanthomonas oryzae.*

The active compounds according to the instant invention can be utilized, if desired, in the form of the usual formulations or compositions with conventional inert (i.e. plant compatible or herbicidally inert) pesticide diluents or extenders, i.e. diluents, carriers or extenders of the type usable in conventional pesticide formulations or compositions, e.g. conventional pesticide dispersible carrier vehicles such as gases, solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: aerosol propellants which are gaseous at normal temperatures and pressures, such as freon; inert dispersible liquid diluent carriers, including inert organic solvents, such as aromatic hydrocarbons (e.g. benzene, toluene, xylene, alkyl naphthalenes, etc.), halogenated, especially chlorinated, aromatic hydrocarbons (e.g. chlorobenzenes, etc.), cycloalkanes (e.g. cyclohexane, etc.), paraffins (e.g. petroleum or mineral oil fractions), chlorinated aliphatic hydrocarbons (e.g. methylene chloride, chloroethylenes, etc.), alcohols (e.g. methanol, ethanol, propanol, butanol, glycol, etc.) as well as ethers and esters thereof (e.g. glycol monomethyl ether, etc.), amines (e.g. ethanolamine, etc.), amides (e.g. dimethyl formamide, etc.), sulfoxides (e.g. dimethyl sulfoxide, etc.), acetonitrile, ketones (e.g. acetone, methyl ethyl ketone, methyl isobutyl ketone, cyclohexanone, etc.), and/or water; as well as inert dispersible finely divided solid carriers, such as ground natural minerals (e.g. kaolins, clays, alumina, silica, chalk, i.e. calcium carbonate, talc, attapulgite, montmorillonite, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfates, alkyl sulfonates, aryl sulfonates, albumin hydroyzates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other insecticides, acaricides, fungicides and bactericides, or rodenticides, nematocides, herbicides, fertilizers, growth-regulating agents, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier compositions mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.0001–10%, preferably 0.01–1%, by weight of the mixture. Thus, the present invention contemplates over-all compositions which comprises mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.001–95%, and preferably 0.01–95%, by weight of the mixture.

The active compounds can also be used in accordance with the well known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 15 to 1000 g/hectare, preferably 40 to 600 g/hectare, are sufficient. In this process it is possible to use highly concentrated liquid compositions with said liquid carrier vehicles containing from about 20 to about 95% by weight of the active compound or even the 100% active substance alone, e.g. about 20–100% by weight of the active compound.

Furthermore, the present invention contemplates methods of selectively killing, combating or controlling pests, e.g. insects, acarids, fungi and bacteria, and more particularly methods of combating at least one of insects, acarids and fungi, which comprises applying to at least one of correspondingly (a) such insects, (b) such acarids, (c) such fungi, (d) such bacteria, and (e) the corresponding habitat thereof, i.e. the locus to be protected, a correspondingly combative or toxic amount, i.e. an insecticidally, acaricidally, fungicidally or bactericidally effective amount, of the particular active compound of the invention alone or together with a carrier vehicle as noted above. The instant formulations or composition are applied in the usual manner, for instance by spraying, atomizing, vaporizing, scattering, dusting, watering, squirting, sprinkling, pouring, fumigating, dressing, encrusting, and the like.

It will be realized, of course, that the concentration of the particular active compound utilized in admixture with the carrier vehicle will depend upon the intended application. Therefore, in special cases it is possible to go above or below the aforementioned that the ranges.

The synthesis, unexpected superiority and outstanding activity of the particular new compounds of the present invention are illustrated, without limitation, by the following examples:

EXAMPLE 1

Phaedon larvae test

Solvent: 3 parts by weight of acetone
Emulsifier: 1 part by weight of alkylaryl polyglycol ether To produce a suitable preparation of active compound, 1 part by weight of the active compound was mixed with the stated amount of solvent containing the stated amount of emulsifier and the concentrate was diluted with water to the desired concentration.

Cabbage plants (*Brassica oleracea*) were sprayed with the preparation of the active compound until dripping wet and were then infested with mustard beetle larvae (*Phaedon cochleariae*).

After the specified periods of time, the degree of destruction was determined in %: 100% means that all beetle larvae were killed whereas 0% means that none of the beetle larvae were killed.

The active compounds, the concentrations of the active compounds, the evaluation times and the results can be seen from the following Table 1:

EXAMPLE 2

Critical concentration test/soil insects

Test insect: Tenebrio larvae in soil
Solvent: 3 parts by weight of acetone
Emulsifier: 1 part by weight of alkylaryl polyglycol ether To prepare a suitable preparation of active compound, 1 part by weight of active compound was mixed with the stated amount of solvent, the stated amount of emulsifier was added and the concentrate was diluted with water to the desired concentration. The preparation of active compound was intimately mixed with the soil. The concentration of the active compound in the preparation was practically immaterial, the only decisive factor being the amount by weight of active compound per unit volume of soil, which is quoted in ppm (for example mg/l). The soil was filled into pots and the pots were left to stand at room temperature. After 24 hours the test animals were introduced into the treated soil and after a further 48 hours the degree of effectiveness of the active compound was determined in % by counting the dead and live test insects. The degree of effectiveness was 100% if all test insects were killed and 0% if exactly as many test insects were still alive as in the case of the control.

The active compounds, amounts used and results can be seen from Table 2 which follows:

Table 1

(Phaedon larvae test)

| Active compound | Active compound concentration in % by weight | Degree of destruction in % after 3 days |
|---|---|---|
| (B) 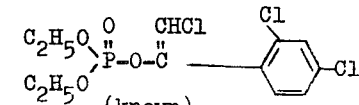 (known) | 0.01 <br> 0.001 | 40 <br> 0 |
| 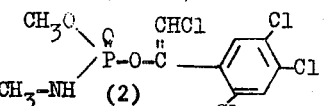 (2) | 0.01 <br> 0.001 | 100 <br> 70 |
| 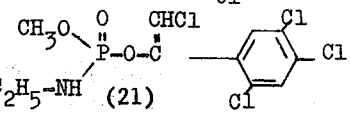 (21) | 0.01 <br> 0.001 | 100 <br> 100 |
| 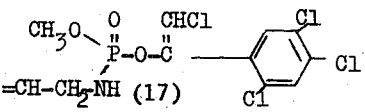 (17) | 0.01 <br> 0.001 | 100 <br> 60 |
| 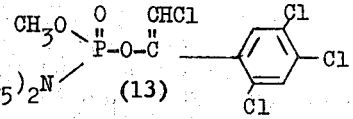 (13) | 0.01 <br> 0.001 | 100 <br> 60 |

Table 2

Critical concentration test/soil insects (Tenebrio molitor larvae in soil)

| Active compound | Degree of destruction in % at an active compound concentration of | | | |
|---|---|---|---|---|
| | 40 | 20 | 10 | 5 ppm |
| 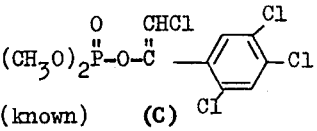 (C) (known) | 75 | 0 | | |
| 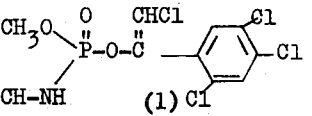 (1) | 100 | 100 | 100 | 50 |
| 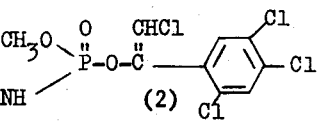 (2) | 100 | 100 | 90 | 30 |
| 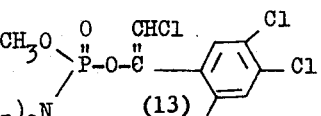 (13) | 100 | 100 | 90 | 50 |
| 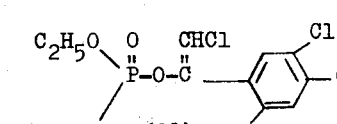 (23) | 100 | 100 | 90 | 50 |
| 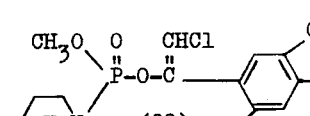 (28) | 100 | 100 | 80 | 50 |
| 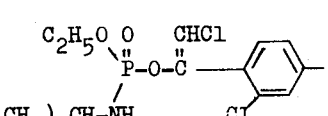 (3) | 100 | 100 | 80 | 50 |

EXAMPLE 3

Critical concentration test/soil insects

Test insect: Phorbia brassicae maggots in soil
Solvent: 3 parts by weight of acetone
Emulsifier: 1 part by weight alkylaryl polyglycol ether To produce a suitable preparation of active compound, 1 part by weight of active compound was mixed with the stated amount of solvent, the stated amount of emulsifier was added and the concentrate was diluted with water to the desired concentration. The preparation of active compound was intimately mixed with the soil. The concentration of the active compound in the preparation was practically immaterial, the only decisive factor being the amount by weight of active compound per unit volume of soil, which is quoted in ppm (for example mg/1). The soil was filled into pots and the pots were left to stand at room temperature. After 24 hours the test animals were introduced into the treated soil and after a further 48 hours the degree of effectiveness of the active compound was determined in % by counting the dead and live test insects. The degree of effectiveness was 100% if all test insects were killed and 0% if exactly as many test insects were still alive as in the case of the control.

The active compounds, amounts used and results can be seen from Table 3 which follows:

Table 3

Critical concentration test/soil insects (*Phorbia brassicae* maggots in soil)

| Active compound | Degree of destruction in % at an active compound concentration of | | | | | |
|---|---|---|---|---|---|---|
| | 40 | 20 | 10 | 5 | 2.5 | 1.25 ppm |
| $(CH_3O)_2\overset{O}{\underset{\|}{P}}-O-\overset{CHCl}{\underset{\|}{C}}-C_6H_3Cl_2$ — Cl (known) (A) | 50 | 0 | | | | |
| $CH_3O, (CH_3)_2CH-NH$ — $P(O)-O-CHCl-C_6H_3Cl_2$—Cl (1) | 100 | 100 | 100 | 100 | 50 | |
| $CH_3O, CH_3-NH$ — $P(O)-O-CHCl-C_6H_3Cl_2$—Cl (2) | 100 | 100 | 100 | 75 | 0 | |
| $C_2H_5O, (CH_3)_2CH-NH$ — $P(O)-O-CHCl-C_6H_3Cl_2$—Cl (9) | 100 | 100 | 90 | 75 | 0 | |
| $C_2H_5O, C_2H_5-NH$ — $P(O)-O-CHCl-C_6H_3Cl_2$—Cl (23) | 100 | 100 | 100 | 100 | 90 | 50 |
| $C_2H_5O, (CH_3)_2CH-NH$ — $P(O)-O-CHCl-C_6H_4Cl$—Cl (3) | 100 | 100 | 100 | 100 | 95 | 80 |
| $C_3H_7O, (CH_3)_2CH-NH$ — $P(O)-O-CHCl-C_6H_3Cl_2$—Cl (20) | 100 | 90 | 80 | 75 | 0 | |
| $C_2H_5O, C_3H_7-NH$ — $P(O)-O-CHCl-C_6H_4Cl$—Cl (44) | 100 | 100 | 90 | 75 | 50 | |

EXAMPLE 4

Tetranychus test (resistant)

Solvent: 3 parts by weight of acetone
Emulsifier: 1 part by weight of alkylaryl polyglycol ether To produce a suitable preparation of active compound, 1 part by weight of the active compound was mixed with the stated amount of solvent containing the stated amount of emulsifier and the concentrate was diluted with water to the desired concentration.

Bean plants (*Phaseolus vulgaris*), which had a height of approximately 10–30 cm, were sprayed with the preparation of the active compound until dripping wet. These bean plants were heavily infested with the two-spotted spider mite (*Tetranychus urticae*) in all stages of development.

After the specified periods of time, the effectiveness of the preparation of active compound was determined by counting the dead mites. The degree of destruction thus obtained was expressed as a percentage: 100% means that all the spider mites were killed whereas 0% means that none of the spider mites were killed.

The active compounds, the concentrations of the active compounds, the evaluation times and the results can be seen from the following Table 4:

Table 4
(Tetranychus test, resistant)

| Active compound | Active compound concentration in %, by weight | Degree of destruction in % after 2 days |
|---|---|---|
| (C) 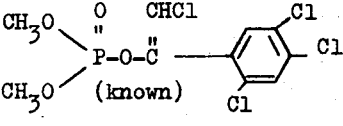 (known) | 0.1 | 0 |
| (A) 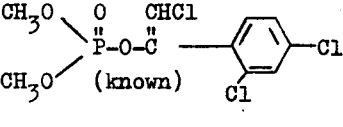 (known) | 0.1 | 0 |
| 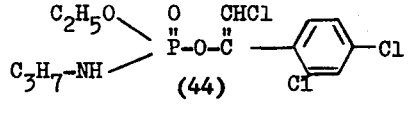 (44) | 0.1<br>0.01 | 100<br>40 |
| 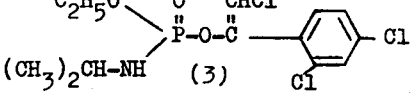 (3) | 0.1<br>0.01 | 100<br>100 |
| 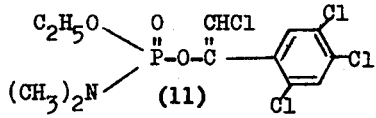 (11) | 0.1<br>0.01 | 95<br>40 |

EXAMPLE 5

Piricularia test: liquid preparation of active compound

Solvent: 1.9 parts by weight of dimethylformamide
Dispersing agent: 0.1 part by weight of alkylaryl polyglycol ether
Other additives: — parts by weight —
Water: 98 parts by weight of water The amount of active compound required for the desired concentration of active compound in the spray liquor was mixed with the stated amount of solvent and dispersing agent, and the concentrate was diluted with the stated amount of water.

30 rice plants about 14 days old were sprayed with the spray liquor until dripping wet. The plants remained in a greenhouse at temperatures of 22° to 24°C and a relative atmospheric humidity of about 70% until they were dry. They were then inoculated with an aqueous suspension of 100,000 to 200,000 spores/ml of *Piricularia oryzae* and placed in a chamber at 24°–26°C and 100% relative atmospheric humidity.

5 days after inoculation, the infectin of all the leaves present at the time of inoculation was determined as a percentage of the untreated but also inoculated control plants. 0% means no infection; 100% means that infection was exactly as great as in the case of the control plants.

The active compounds, the concentrations of the active compounds and the results can be seen from the following Table 5:

Table 5
(Piricularia test/liquid preparation of active compound)

| Active compound | | Infection in % of the infection of the untreated control at an active compound concentration by weight of | |
|---|---|---|---|
| | | 0.05 | 0.025% |
| (E) 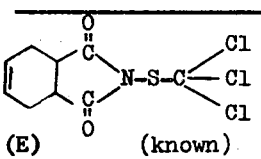 (known) | pr.<br>cur. | 75<br>100 | 100 |
| (C) 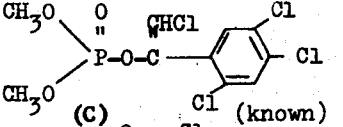 (known) | pr. | 100 | |
| (B) 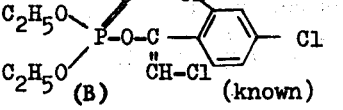 (known) | pr. | 100 | |

TABLE 5 – Continued (Piricularia test/liquid preparation of active compound)

| Active compound | | Infection in % of the infection of the untreated control at an active compound concentration by weight of | |
|---|---|---|---|
| | | 0.05 | 0.025% |
| 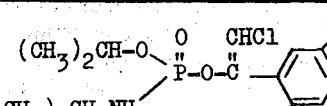 (4) | pr. | 0 | 13 |
| 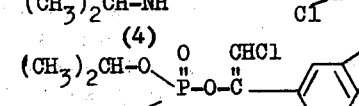 (5) | pr.<br>cur. | 0<br>0 | 0 |
| 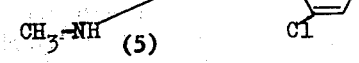 (7) | pr.<br>cur. | 0<br>0 | 0 |
| 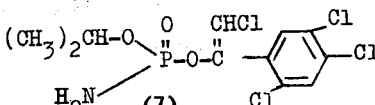 (8) | pr.<br>cur. | 0<br>0 | 0 |
| 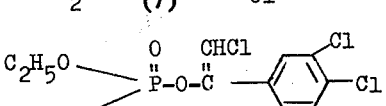 (24) | pr.<br>cur. | 0<br>50 | 75 |
| 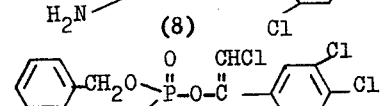 (34) | pr. | 0 | 25 |
| 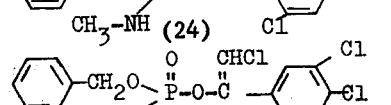 (47) | pr.<br>cur. | 0<br>25 | 0 |
| 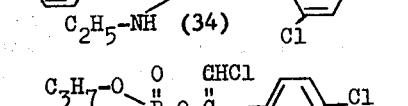 (42) | pr.<br>cur. | 0<br>0 | 0 |
| 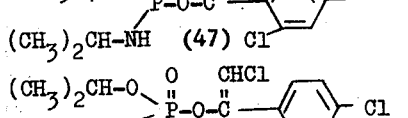 (43) | pr.<br>cur. | 0<br>0 | 0 |
| 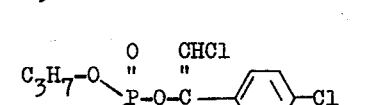 (44) | pr.<br>cur. | 0<br>17 | 25 |
| 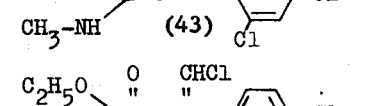 (45) | pr.<br>cur. | 0<br>25 | 0 |
| 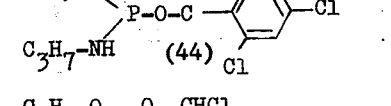 (46) | pr.<br>cur. | 0<br>0 | 0 |

The abbreviations mean : pr. = protective action
cur. = curative action

The following examples illustrate the synthesis of the compounds.

a) 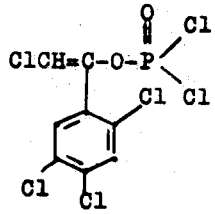

183 g of 0,0-dimethyl-0-[1-(2',4',5'-trichlorophenyl)-2-chlorovinyl]-phosphoric acid ester were added to a suspension of 225 g of phosphorus pentachloride in 150 ml of phosphorus oxychloride while stirring at 80° to 90°C. The batch was heated for three to four hours under vigorous reflux; thereafter, all volatile substances were distilled off under reduced pressure. The solid residue was suspended in a little petroleum ether and the crystalline product was filtered off, whereby 156 g (83% of theory) of 0-[1-(2',4',5'-trichlorophenyl)-2-chlorovinyl]-phosphoric acid ester dichloride of melting point 108°C were obtained.

EXAMPLE 6 b) 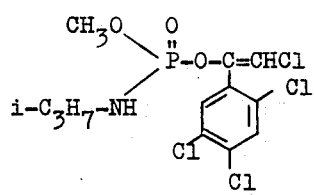 (1)

75 g (0.2 mole) of 0-[1-(2'4',5'-trichlorophenyl)-2-chlorovinyl]-phosphoric acid ester dichloride were dissolved in 200 ml of benzene and a mixture of 7 g (0.21 mole) of methanol, 21 g of triethylamine and 50 ml of benzene was added dropwise to this solution at 20°C. The batch was subsequently stirred for a further half hour at 40°C, after cooling to 20°C a solution of 12 g (0.22 mol) of isopropylamine, 21 g of triethylamine and 50 ml of benzene was added dropwise, the reaction mixture was stirred for a further half hour at 30°C and cooled to 15°–20°C, the salt-like precipitate which had separated out was filtered off washed with benzene, the filtrate was concentrated under reduced pressure and the residue was extracted with boiling petroleum ether. On concentrating the petroleum ether extract, 63 g (80% of theory) of 0-methyl-01-[1-(2',4',5'-trichlorophenyl)-2-chlorovinyl]-N-isopropylphosphoric acid diesteramide of melting point 90°C were obtained.

EXAMPLE 7

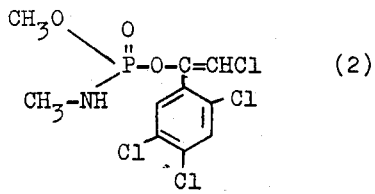 (2)

A mixture of 7 g (0.21 mole) of methanol, 21 g of triethylamine and 50 ml of benzene was added dropwise, at 20° to 30°C, to a solution of 75 g (0.2 mole) of 0-[1-(2',4',5'-trichlorophenyl)-2-chlorovinyl]-phosphoric acid ester dichloride in 200 ml of benzene. The reaction mixture was thereafter stirred for a further half hour at 40°C and was then cooled to 20°C. A solution of 8 g (0.25 mole) of methylamine, 21 g of triethylamine and 100 ml of benzene was subsequently added dropwise to the mixture at this temperature, the batch was stirred for a further half hour at 40°C to complete the reaction and the salt-like precipitate which had separated out was filtered off and washed with benzene. The filtrate was washed once with 500 ml of water to which 5 ml of concentrated hydrochloric acid had been added subsequently twice more, with 500 ml of pure water each time. After drying the solution, the solvent was distilled off under reduced pressure. 45 g (61.5% of theory) of the crystalline 0-methyl-0-[1-(2',4',5'-trichlorophenyl)-2-chlorovinyl]-N-methyl-phosphoric acid diesteramide of melting point 108°C were left.

EXAMPLE 8 a) 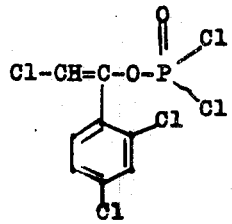

A suspension of 230 g of phosphorus pentachloride in 150 ml of phosphorus oxychloride was heated to 80°–90°C while stirring. 166 g of 0,0-dimethyl-0-[1-(2',4'-dichlorophenyl)-2-chlorovinyl]-phosphoric acid ester were then added to the mixture in portions and the batch was heated to the boil under reflux for three to four hours. Thereafter, all volatile constituents were distilled off under reduced pressure. The residue was distilled, and in this way 157 g (88.5% of theory) of pure 0-[1-(2',4'-dichlorophenyl)-2-chlorovinyl]-phosphoric acid ester dichloride of boiling point 130° to 140°C/0.01 mm Hg and refractive index $n_D^{20}$ = 1.5772 were obtained.

b) 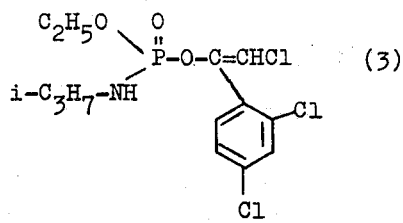 (3)

A mixture of 10 g (0.21 mole) of ethanol, 22 g of triethylamine and 70 ml of toluene was added dropwise to a solution of 68.1 g (0.2 mole) of 0-[1-(2',4'-dichlorophenyl)2-chlorovinyl]-phosphoric acid ester dichloride in 430 ml of toluene at −5°C, and a second solution of 26 g (0.44 mole) of isopropylamine in 70 ml of toluene was subsequently added dropwise to the reaction mixture. After completion of the addition, the batch was stirred for a further 2 hours at −5°C, the salty precipitate which had separated out was dissolved by stirring with 200 ml of water and the solution was washed with 115 ml of 10% strength hydrochloric acid and subsequently with water, and dried over sodium sulfate. Finally, the volatile constituents were evaporated under reduced pressure and 51.5 g (69% of theory) of crystalline 0-ethyl-0-[1-(2',4'-dichlorophenyl)-2-chlorovinyl]-N-isopropylphosphoric acid diesteramide of melting point 53° to 55°C were obtained as the residue.

The compounds identified in Tables 6 and 7 below were prepared in a manner analogous to that of the preceding Examples. In the tables, the compounds have the general formulas (X). and (X) The melting points of the crystalline compounds and the refractive indices of the liquid compounds are given in the tables.

Table 6

(IX)

| Cpd. No. | R | R' | R" | Melting point (°C) | Refractive index $n_D^{20}$ | Yield (% of theory) |
|---|---|---|---|---|---|---|
| 4 | i-C$_3$H$_7$ | i-C$_3$H$_7$ | H | 77 | | 54.5 |
| 5 | i-C$_3$H$_7$ | CH$_3$ | H | 97 | | 61 |
| 6 | C$_2$H$_5$ | CH$_3$ | H | 92 | | 67 |
| 7 | i-C$_3$H$_7$ | H | H | 84 | | 82 |
| 8 | C$_2$H$_5$ | H | H | 96-97 | | 70 |
| 9 | C$_2$H$_5$ | i-C$_3$H$_7$ | H | 79 | | 44 |
| 10 | CH$_3$ | CH$_3$ | CH$_3$ | 80 | | 91 |
| 11 | C$_2$H$_5$ | CH$_3$ | CH$_3$ | 58 | | 67.5 |
| 12 | i-C$_3$H$_7$ | CH$_3$ | CH$_3$ | 86 | | 59 |
| 13 | CH$_3$ | C$_2$H$_5$ | C$_2$H$_5$ | 61 | | 38 |
| 14 | CH$_3$ | CH$_2$=CH-CH$_2$ | H | 77 | | 64 |
| 15 | CH$_3$ | H | H | | 1.575 | 57 |
| 16 |  | CH$_3$ | H | 85 | | 60 |
| 17 | CH$_2$=CH-CH$_2$ | CH$_3$ | H | 95 | | 79 |
| 18 | Cl-CH$_2$-CH$_2$ | CH$_3$ | H | 89 | | 87 |
| 19 | C$_6$H$_5$- | CH$_3$ | H | 87 | | 84 |
| 20 | n-C$_3$H$_7$ | i-C$_3$H$_7$ | H | 118 | | 64 |
| 21 | CH$_3$ | C$_2$H$_5$ | H | 73 | | 96 |

Continuation of Table 6

| Cpd. No. | R | R' | R" | Melting point (°C) | Refractive index $n_D^{20}$ | Yield (% of theory) |
|---|---|---|---|---|---|---|
| 22 | i-C$_3$H$_7$ | C$_2$H$_5$ | H | 67 | | 52.5 |
| 23 | C$_2$H$_5$ | C$_2$H$_5$ | H | 67 | | 59.5 |
| 24 | C$_6$H$_5$-CH$_2$ | CH$_3$ | H | 90 | | 46.5 |
| 25 | CH$_2$=CH-CH$_2$ | i-C$_3$H$_7$ | H | 65 | | 46.5 |
| 26 | Cl-C$_6$H$_4$- | CH$_3$ | H | 92 | | 89.5 |
| 27 | n-C$_3$H$_7$ | C$_2$H$_5$ | H | 72 | | 66.5 |
| 28 | CH$_3$ | -CH$_2$-CH$_2$-CH$_2$-CH$_2$-CH$_2$- (cyclohexyl) | | 74 | | 44 |
| 29 | C$_6$H$_5$-CH$_2$-CH$_2$ | CH$_3$ | H | 77 | | 85.5 |
| 30 | Br-CH$_2$-CH$_2$ | C$_2$H$_5$ | H | 63 | | 89 |
| 31 | Cl$_3$C-CH$_2$ | C$_2$H$_5$ | H | 89 | | 67.5 |
| 32 | CH$_3$O-CH$_2$-CH$_2$ | CH$_3$ | H | 60 | | 66 |
| 33 | i-C$_4$H$_9$ | i-C$_3$H$_7$ | H | 62 | | 44.5 |
| 34 | C$_6$H$_{11}$-CH$_2$ | C$_2$H$_5$ | H | 83 | | 68.5 |
| 35 | CH$_2$=CH-CH$_2$ | C$_2$H$_5$ | H | 65 | | 80 |
| 36 | C$_2$H$_5$ | C$_6$H$_5$-CH$_2$ | H | 106 | | 82 |
| 37 | sec.-C$_4$H$_9$ | i-C$_3$H$_7$ | H | | 1.5400 | 73.5 |
| 38 | n-C$_8$H$_{17}$ | CH$_3$ | H | | 1.5281 | 74.5 |
| 39 | n-C$_7$H$_{15}$ | CH$_3$ | H | | 1.5316 | 79 |
| 40 | CH$_3$-C$_6$H$_4$- | C$_2$H$_5$ | H | 75 | | 34.5 |
| 41 | C$_2$H$_5$O-CH$_2$-CH$_2$ | C$_2$H$_5$ | H | | 1.5409 | 57 |

Table 7

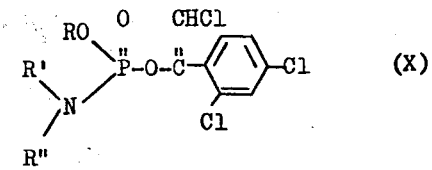

| Cpd. No. | R | R' | R" | Melting point (°C) | Refractive index $n_D^{20}$ | Yield (% of theory) |
|---|---|---|---|---|---|---|
| 42 | i-C$_3$H$_7$ | CH$_3$ | H | | 1.5408 | 83.5 |
| 43 | n-C$_3$H$_7$ | CH$_3$ | H | | 1.5420 | 74 |
| 44 | C$_2$H$_5$ | n-C$_3$H$_7$ | H | | 1.5376 | 88.5 |
| 45 | n-C$_3$H$_7$ | n-C$_3$H$_7$ | H | | 1.5312 | 79 |
| 46 | i-C$_3$H$_7$ | n-C$_3$H$_7$ | H | | 1.5314 | 76 |
| 47 | n-C$_3$H$_7$ | i-C$_3$H$_7$ | H | | 1.5303 | 81.5 |

Other compounds which may be similarly prepared include:

0-(4-bromobutyl)-0-[1-(4'-bromophenyl)-2-chloro]-vinyl-N,N-diallyl-phosphoric acid diester-amide, 0-dodecyl-0-(1-pentabromophenyl-2-chloro)-vinyl-N-phenethyl-phosphoric acid diester-amide, 0-methallyl-0-[1-(4'-chlorophenyl)-2-chloro]-vinyl-phosphoric acid diester-morpholide, 0-butoxybutyl-[1-(2',4'-dichlorophenyl)-2-chloro]-vinyl-N,N-diethyl-phosphoric acid diester-piperazide, 0-(2,4,6-trimethyl-phenyl)-[1-(2',4'-dichlorophenyl)-2-chloro]-vinyl-N,N-dimethyl-phosphoric acid diester-amide, 0-[3,5-dibromo-cyclopent-(1)-en-4-yl]-[1-(2',4',5'-tribromophenyl)-2-chloro]-N,N-dimethyl-phosphoric acid diester amide, and the like.

It will be appreciated that the instant specification and examples are set forth by way of illustration and not limitation, and that various modifications and changes may be made without departing from the spirit and scope of the present invention.

What is claimed is:

1. An O-(1-halophenyl-2-chloro)-vinyl-phosphoric acid diester-amide of the formula

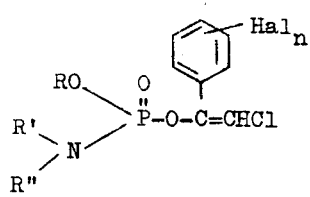

in which

R is alkyl of 1 to 12 carbon atoms, haloalkyl of 1 to 4 carbon atoms, alkenyl of 2 to 6 carbon atoms, or pheny, phenylalkyl, cycloalkyl, cycloalkenyl or cycloalkenalkyl optionally substituted by halogen or alkyl of 1 to 4 carbon atoms, R' and R" each independently is hydrogen, lower alkyl, alkenyl or phenylalkyl, Hal is chlorine or bromine, and $n$ is an integer from 1 to 5.

2. A compound according to claim 1 in which R is alkyl of 1 to 10 carbon atoms, chloroethyl, allyl, phenyl, chlorophenyl, phenylalkyl of 1 to 3 carbon atoms in the alkyl moiety, cyclohexyl, p-methylcyclohexyl, cyclohexylmethyl, cyclohexylethyl or cyclohex-(1)-en-4-yl-methyl, R' and R" are hydrogen, alkyl of 1 to 4 carbon atoms, allyl or benzyl, Hal is chlorine and $n$ is 2 or 3.

3. A compound according to claim 1 wherein such compound is O-ethyl-O-[1-(2',4'-dichlorophenyl)-2-chloro]-vinyl-N-isopropyl-phosphoric acid diester-amide of the formula

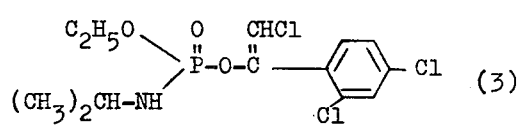

4. A compound according to claim 1 wherein such compound is O-ethyl-O-[1-(2,4-dichlorophenyl)-2-chloro]-vinyl-N-propyl-phosphoric acid diester-amide of the formula

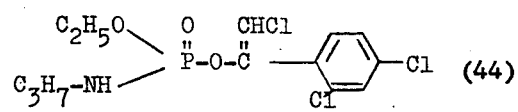

5. A compound according to claim 1 wherein such compound is 0-methyl-0-[1-(2',4',5'-trichlorophenyl)-2-chloro]-vinyl-N-isopropyl-phosphoric acid diester-amide of the formula

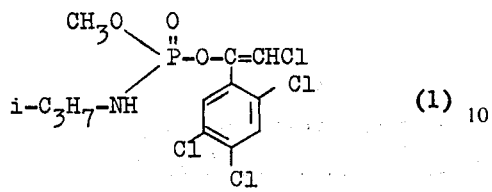 (1)

6. A compound according to claim 1 wherein such compound is 0-methyl-0-[1-(2',4',5'-trichlorophenyl)-2-chloro]-vinyl-N-ethyl-phosphoric acid diester-amide of the formula

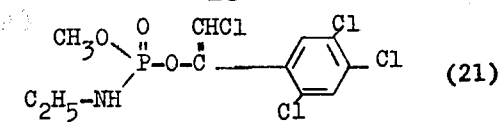 (21)

7. A compound according to claim 1 wherein such compound is 0-ethyl-0-[1-(2',4',5'-trichlorophenyl)-2-chloro]-vinyl-N-ethylphosphoric acid diester- amide of the formula

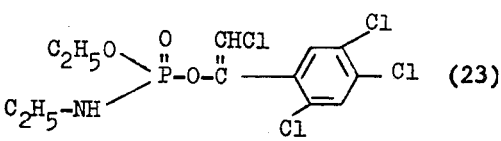 (23)

* * * * *